(12) United States Patent
Hathaway et al.

(10) Patent No.: US 8,366,592 B2
(45) Date of Patent: Feb. 5, 2013

(54) QUICK CHANGE SPINDLE

(75) Inventors: Thomas J. Hathaway, Farmington Hills, MI (US); Michael A. Hageman, Redford, MI (US); James W. Grimes, Howell, MI (US)

(73) Assignee: Cinetic Automation Corp., Farmington Hills, MI (US)

( * ) Notice: Subject to any disclaimer, the term of this patent is extended or adjusted under 35 U.S.C. 154(b) by 1467 days.

(21) Appl. No.: 11/948,345

(22) Filed: Nov. 30, 2007

(65) Prior Publication Data

US 2009/0139375 A1    Jun. 4, 2009

(51) Int. Cl.
*B23Q 3/157* (2006.01)
*B23B 31/107* (2006.01)

(52) U.S. Cl. ............... 483/16; 483/901; 483/55; 483/31; 901/41; 81/177.85; 279/2.12; 279/2.23; 279/84; 279/905; 403/322.2; 403/322.3; 403/328; 29/525.02

(58) Field of Classification Search .................... 483/16, 483/901, 54–55, 57, 59, 60, 30, 31, 34; 279/2.12, 279/2.23, 2.1, 2.11, 75, 84, 905, 900; 29/795, 29/525.01, 525.02, 525.11; 403/326–328, 403/322.2, 322.3; 81/177.85; 901/41
See application file for complete search history.

(56) References Cited

U.S. PATENT DOCUMENTS

| | | | |
|---|---|---|---|
| 1,864,466 A * | 6/1932 | Peterson | ...................... 279/2.23 |
| 4,209,182 A | 6/1980 | Sheldon | |
| 4,378,959 A | 4/1983 | Susnjara | |
| 4,784,421 A * | 11/1988 | Alvite' | ........................... 483/901 |
| 4,858,939 A | 8/1989 | Riggs | |
| 4,883,939 A * | 11/1989 | Sagi | .............................. 483/901 |
| 4,897,014 A | 1/1990 | Tietze | |
| 5,211,501 A * | 5/1993 | Nakamura et al. | ......... 403/322.3 |
| 5,271,697 A | 12/1993 | Johnson et al. | |
| 5,390,571 A | 2/1995 | Fox, III et al. | |
| 5,417,527 A | 5/1995 | Wienhold | |
| 5,768,767 A | 6/1998 | Burchell et al. | |
| 5,993,364 A * | 11/1999 | Matsuura et al. | ............... 483/16 |
| 6,193,242 B1 | 2/2001 | Robison | |
| 6,196,094 B1 | 3/2001 | Erickson | |
| 6,241,026 B1 | 6/2001 | Wache et al. | |
| 6,243,621 B1 | 6/2001 | Tao et al. | |
| 6,398,279 B1 | 6/2002 | Kikut | |
| 6,523,441 B2 | 2/2003 | Lee | |
| 6,705,454 B2 | 3/2004 | Fishaw et al. | |
| 6,810,974 B2 | 11/2004 | Lyon et al. | |
| 6,823,762 B2 | 11/2004 | Hu | |
| 6,854,740 B2 | 2/2005 | Baumann et al. | |
| 6,973,905 B2 | 12/2005 | Hathaway et al. | |
| 7,055,408 B2 | 6/2006 | Sasaki | |
| 7,121,774 B2 | 10/2006 | Hirt et al. | |

* cited by examiner

FOREIGN PATENT DOCUMENTS

JP    61-019526 A  *  1/1986

OTHER PUBLICATIONS

Cinetic Automation Corporation; Cinetic Automation Corporation Spindle-Manual, 3 pages of photographs (sold before Nov. 2006).

*Primary Examiner* — Erica E Cadugan

(74) *Attorney, Agent, or Firm* — Harness, Dickey & Pierce, P.L.C.

(57) ABSTRACT

An automated tool includes a quick change spindle assembly. In another aspect of the present invention, the quick change spindle includes an attachment assembly for interchangeable fastener drivers. A further aspect of the present invention employs release member to actuate a drive member in the spindle assembly causing a retainer to uncouple a fastener driver with the spindle.

34 Claims, 10 Drawing Sheets

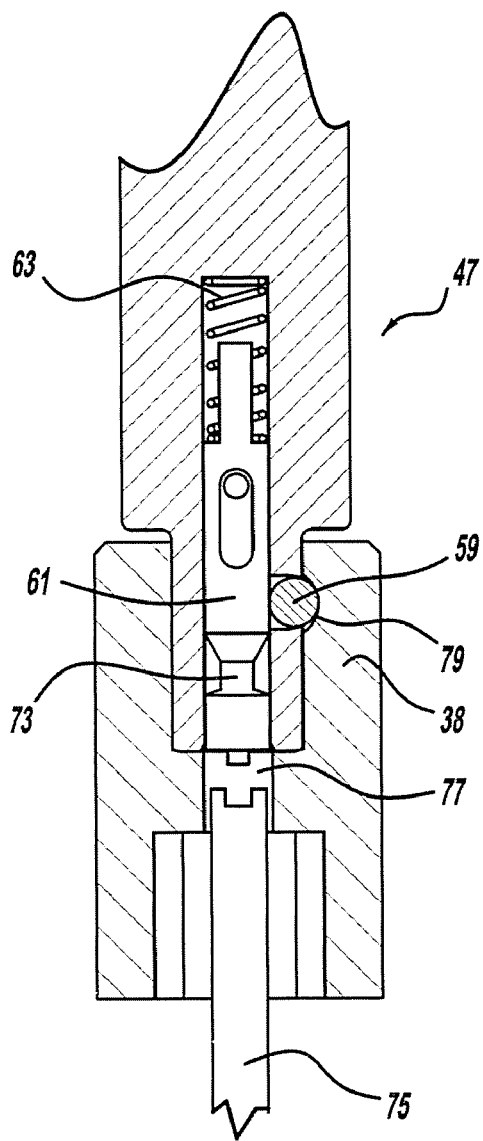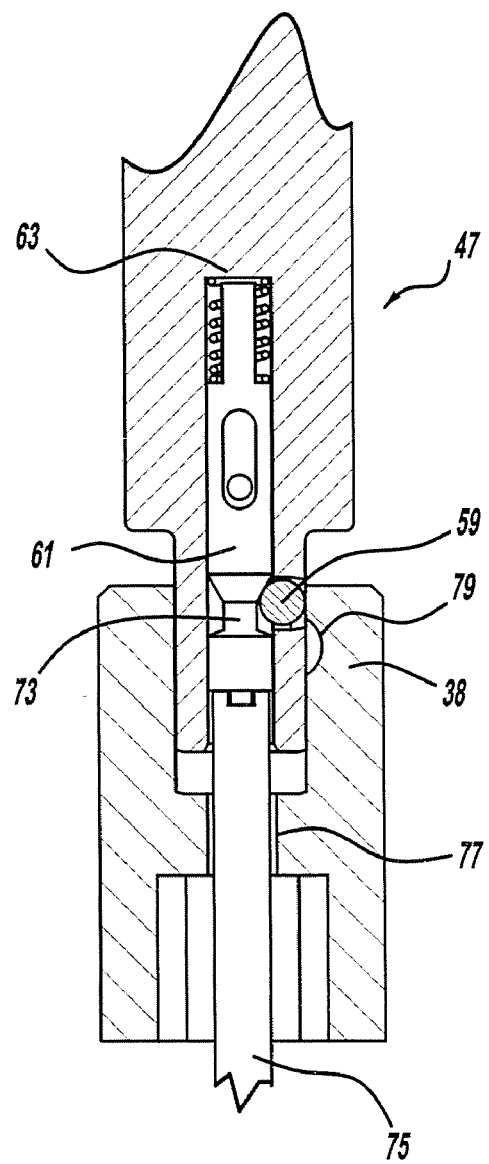
*FIG - 9*
*FIG - 10*

QUICK CHANGE SPINDLE

BACKGROUND AND SUMMARY OF THE INVENTION

The present invention relates to automated tool systems having interchangeable fastener drivers and more particularly to a device and method for automating the process of changing fastener drivers on an automated tool system.

In many assembly processes, a tool system may need to perform several different operations on fasteners of different geometries, each requiring a unique fastener driver. Past tool systems required manual intervention to change a fastener driver to perform a new operation or multiple separate drivers were employed. Manually changing fastener drivers, however, often decreases the efficiency of processes, and the sequence of tasks performed by a particular system may require multiple fastener drivers or multiple tool systems, thus further complicating and slowing the assembly cycle and/or increasing expense. As assembly cycle times continue to improve, an automated tool system is needed to decrease the time to change the fastener drivers.

Examples of tools having manually operated mechanisms for interchangeable fastener drivers are disclosed in the following U.S. Pat. No. 6,823,762 entitled "Wrench Extension with a Socket-Coupling System" which issued to Hu on Nov. 30, 2004; U.S. Pat. No. 6,523,441 entitled "Switch Device of Socket Wrench Extension" which issued to Lee on Feb. 25, 2003; and U.S. Pat. No. 5,390,571 entitled "Push Button Socket Locking Mechanism" which issued to Fox, III et al. on Feb. 21, 1995; all of which are incorporated by reference herein. Each provides for a system to hold and release a socket. However, each also requires manual actuation of the mechanism.

In accordance with the present invention, an automated tool includes a quick change spindle assembly. In another aspect of the present invention, the quick change spindle includes an attachment assembly for interchangeable fastener drivers. A further aspect of the present invention employs a holder assembly with an automated release member to actuate a drive member in a spindle assembly thereby causing a retainer to uncouple a fastener driver with the spindle. Still another aspect of the present invention utilizes a restoring member to return a drive member back to an extended position causing the retainer to couple a fastener driver with a spindle. In yet another aspect of the present invention, a system can perform multiple tasks using multiple fastener drivers without manual intervention to change fastener drivers.

The present quick change spindle is advantageous over previous devices in that the present invention significantly improves assembly cycle times. Automating the process of changing fastener drivers decreases tool changeover times and reduces the potential for human error. Furthermore, the present invention facilitates easier removal and attachment of fastener drivers without the disadvantage of misplacing drivers during or after changes. Further areas of applicability will become apparent from the description provided herein. It should be understood that the description and specific examples are intended for purposes of illustration only and are not intended to limit the scope of the present disclosure. Additional features and advantages of the present invention will be shown and described with reference to the following description and appended figures.

BRIEF DESCRIPTION OF THE DRAWINGS

The drawings described herein are for illustration purposes only and are not intended to limit the scope of the present disclosure in any way.

FIG. 9 is a partial cross-sectional view of a fastener driver engaged with the preferred embodiment spindle assembly and an automated release member in a fully retracted position;

FIG. 10 is a partial cross-sectional view of a fastener driver in partial engagement with the preferred embodiment spindle assembly and the automated release member in a fully extended position;

DETAILED DESCRIPTION OF THE PREFERRED EMBODIMENTS

Figure 1:
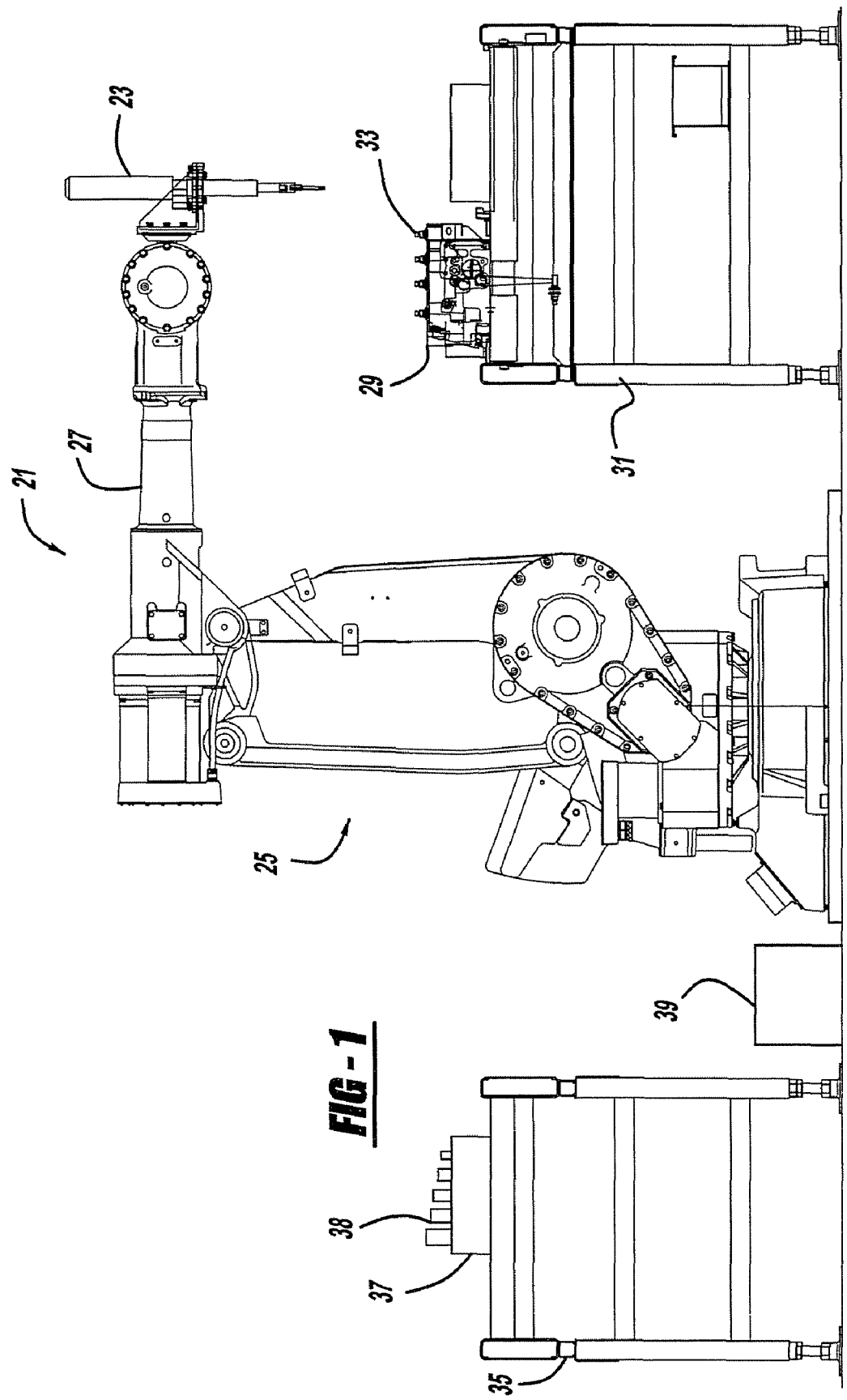
FIG. 1 is a side elevational view of an automated work station showing a robot arm with a quick change spindle assembly, a tool stand with a fastener driver holder assembly, and a work piece with various fasteners.

FIG. 1 shows a work station 21 in an assembly plant that employs the preferred embodiments of a quick change spindle assembly 23. An articulated or gantry robot 25 has an arm 27 that holds spindle assembly 23. Robot arm 27 moves spindle assembly 23 into various positions to perform operations on a work piece 29 located on a conveyor 31. An exemplary conveyor is disclosed in U.S. Pat. No. 6,705,454, entitled "Accumulating Power Roll Conveyor System" which issued to Fishaw et al. on Mar. 16, 2004, which is incorporated by reference herein. The work piece 29 is preferably a powertrain component such as an automotive vehicle engine block but may alternately be another component having fasteners 33. Robot arm 27 also moves spindle assembly 23 to a stand 35 where a holder assembly 37 accommodates multiple fastener drivers 38. A computer microprocessor 39 or other programmable controller includes software instructions which control robot 25, spindle assembly 23, and holder assembly 37.

Figure 2:
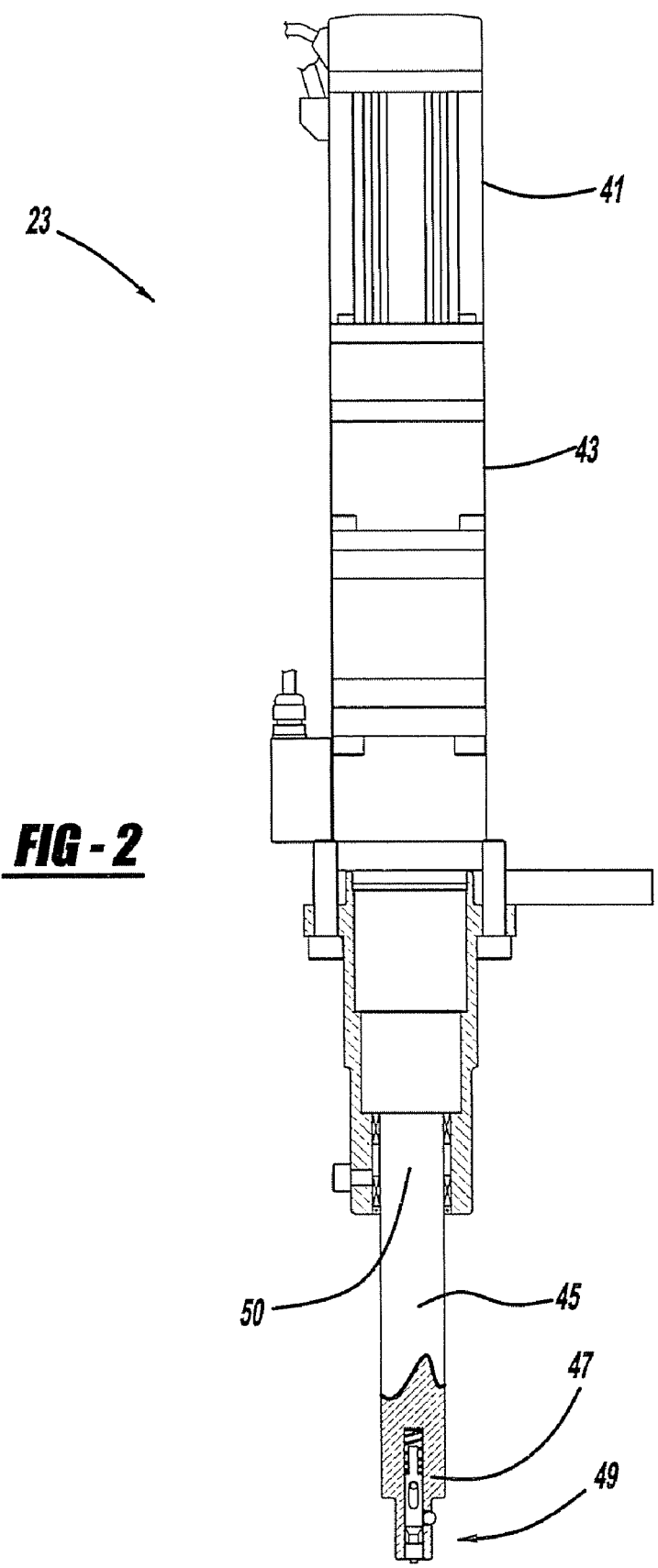
FIG. 2 is a partial cross-sectional view of the preferred embodiment quick change spindle assembly showing the attachment assembly at the distal end of the spindle.

Referring now to FIG. 2, spindle assembly 23 includes an electric motor actuator 41 controlled by computer 39. In addition, force sensing devices such as torque and/or current sensors 43 are disposed within spindle assembly 23 to detect force levels applied to spindle assembly 23 and send appropriate signals to computer 39. Spindle assembly 23 further includes a spindle 45 which is an elongated shaft. The distal end 47 of spindle 45 houses an attachment assembly 49. At the proximal end 50, spindle 45 engages a drive system coupled to actuator 41.

Figure 3:
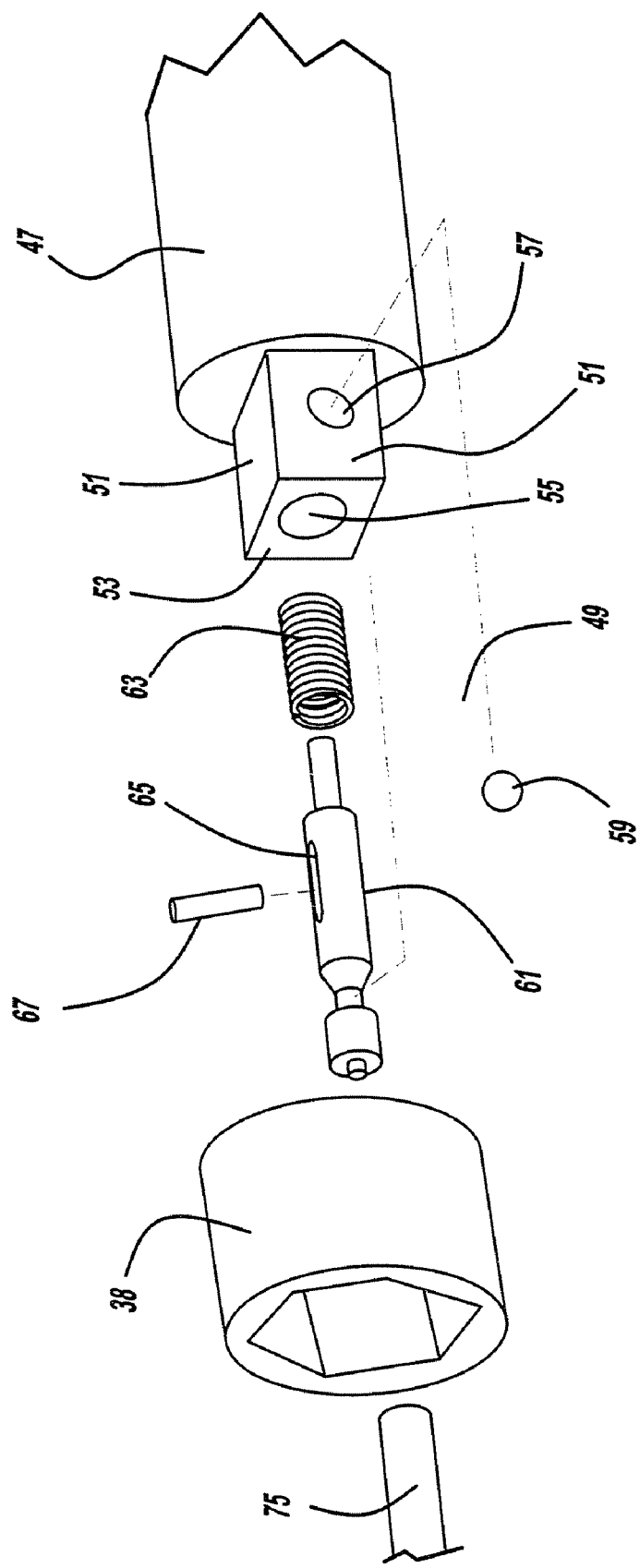
FIG. 3 is an exploded and fragmentary perspective view of the preferred embodiment spindle.

In FIG. 3, distal end 47 of spindle 45 forms a square periphery defined by generally flat side walls 51 and a generally flat end face 53. An axial bore 55 extends from end face 53 into distal end 47. A radial bore 57 extends from side wall 51 into distal end 47 and communicates with axial bore 55. Radial bore 57 has a decreasing circumference near the side wall 51. Attachment assembly 49 includes a locking ball 59 partially disposed within radial bore 57 and operable to partially extend beyond the plane defined by side wall 51. A drive member 61 partially disposed within axial bore 55 is operable to extend from and retract within distal end 47. A spring 63, or alternately another restoring member, disposed within axial bore 55 is operable to position drive member 61 within axial bore 55. A slot 65 in drive member 61 and a guide pin 67, fixed within distal end 47, are operable to prevent rotation of drive member 61 within axial bore 55.

Figure 4:
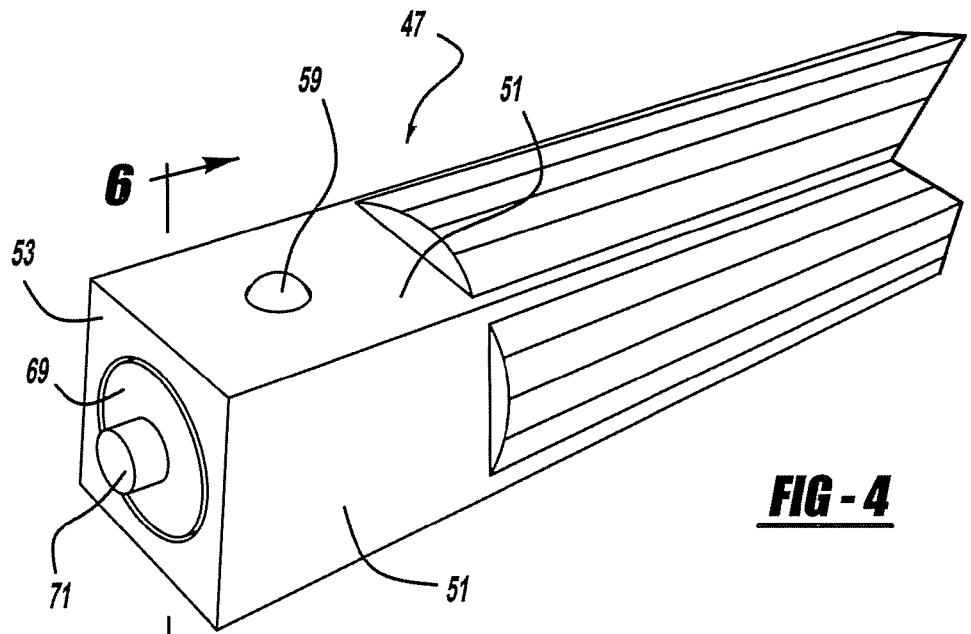
FIGS. 4 and 5 are fragmentary perspective views showing the distal end of the preferred embodiment spindle assembly with a drive member in fully extended and fully retracted positions, respectively.
Figure 5:
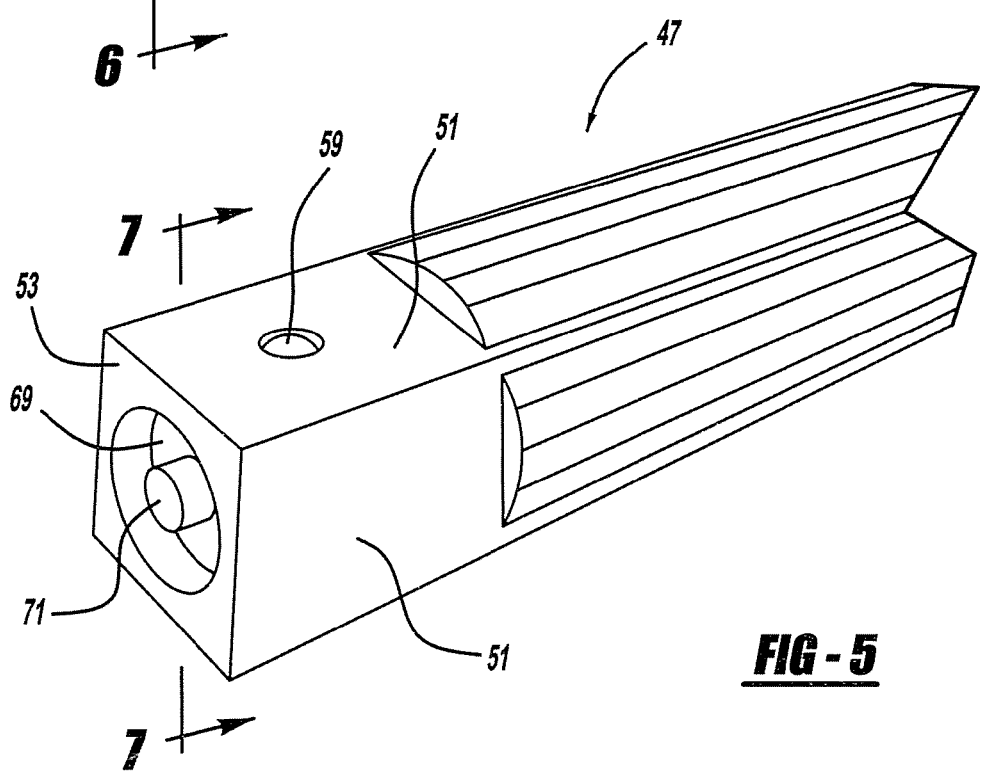
Figure 6:
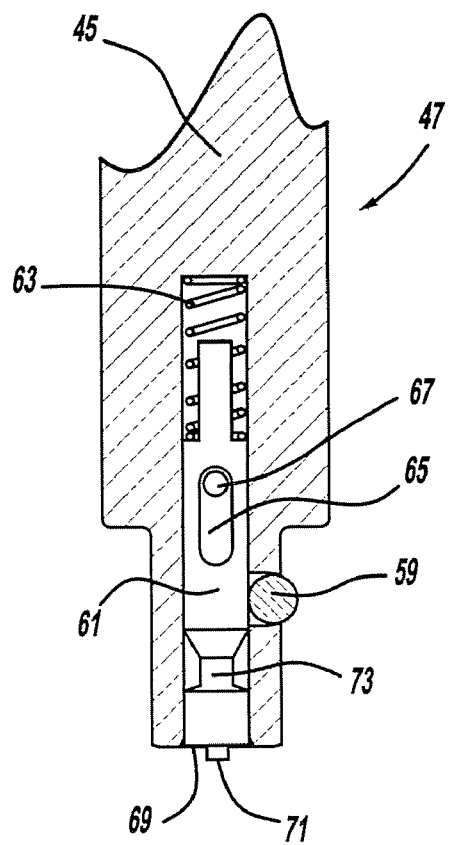
FIGS. 6 and 7 are partial cross-sectional views of the preferred embodiment spindle assembly, taken along lines 6 and 7 of FIGS. 4 and 5, respectively, with the drive member in fully extended and fully retracted positions, respectively.
Figure 7:
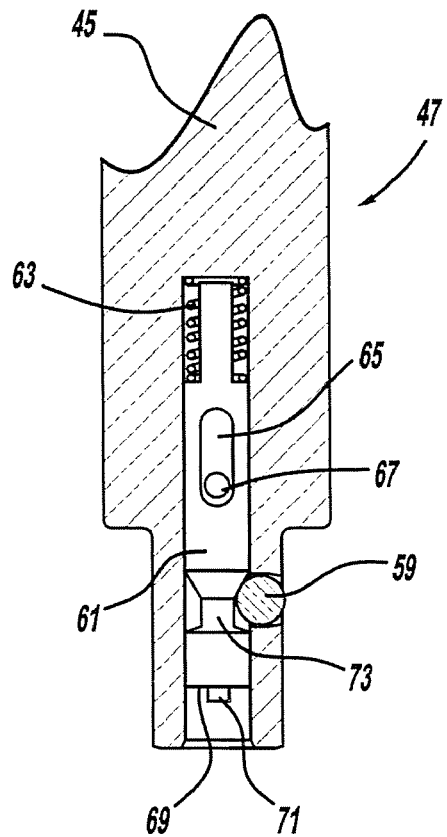
Figure 8:
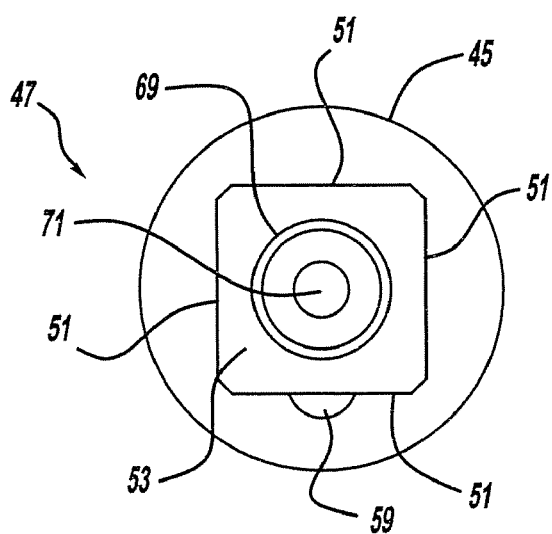
FIG. 8 is an end elevational view of an end face of the preferred embodiment spindle assembly in a fully extended position.

FIGS. 4-8 further illustrate distal end 47 and the interaction between drive member 61 and locking ball 59. Drive member 61 has an exposed end 69 and is operable to move relative to spindle 45. Exposed end 69 may include a projection 71 or other means to aid in locating spindle 45 during operation. Movement of drive member 61 is limited by guide pin 67 which is fixed to spindle 45 and passes through slot 65 in drive member 61. Spring 63 is operable to position drive member 61 into a locked position as shown in FIGS. 4 and 6. Furthermore, drive member 61 has a recess 73 operable to receive locking ball 59 when in an unlocked position as shown in FIGS. 5 and 7.

FIGS. 9 and 10 illustrate the process by which distal end 47 engages and disengages with fastener driver 38 such as a socket. In FIG. 9, controller 39 causes an automated release member 75 to retract away from distal end 47 through fastener aperture 77, allowing spring 63 to displace drive member 61 into an extended position in which locking ball 59 contacts fastener driver 38 at a fastener driver recess 79. Release member 75 is moved by a servo or other drive system controlled by controller 39. Fastener driver 38 is then locked to distal end 47. In FIG. 10, automated release member 75 extends towards distal end 47 through fastener aperture 77, forcing drive member 61 into a retracted position in which locking ball 59 partially contacts recess 73. As locking ball 59 disengages fastener driver recess 79, fastener driver 38 is operable to uncouple from distal end 47.

Figure 11:
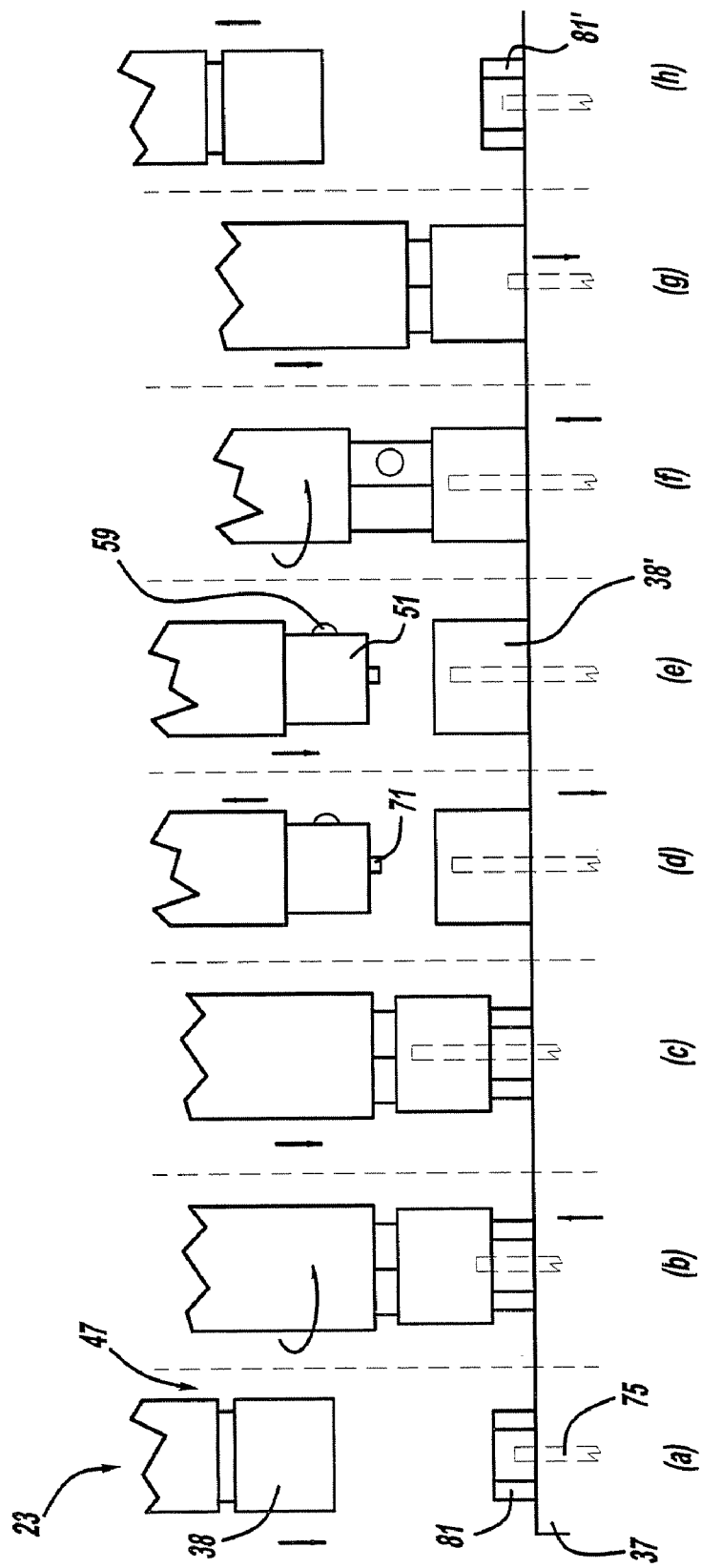
FIG. 11 is a series of side views showing the process by which the preferred embodiment spindle assembly uncouples and couples with a fastener driver as the automated release member of the holder assembly actuates the drive member.
Figure 12:
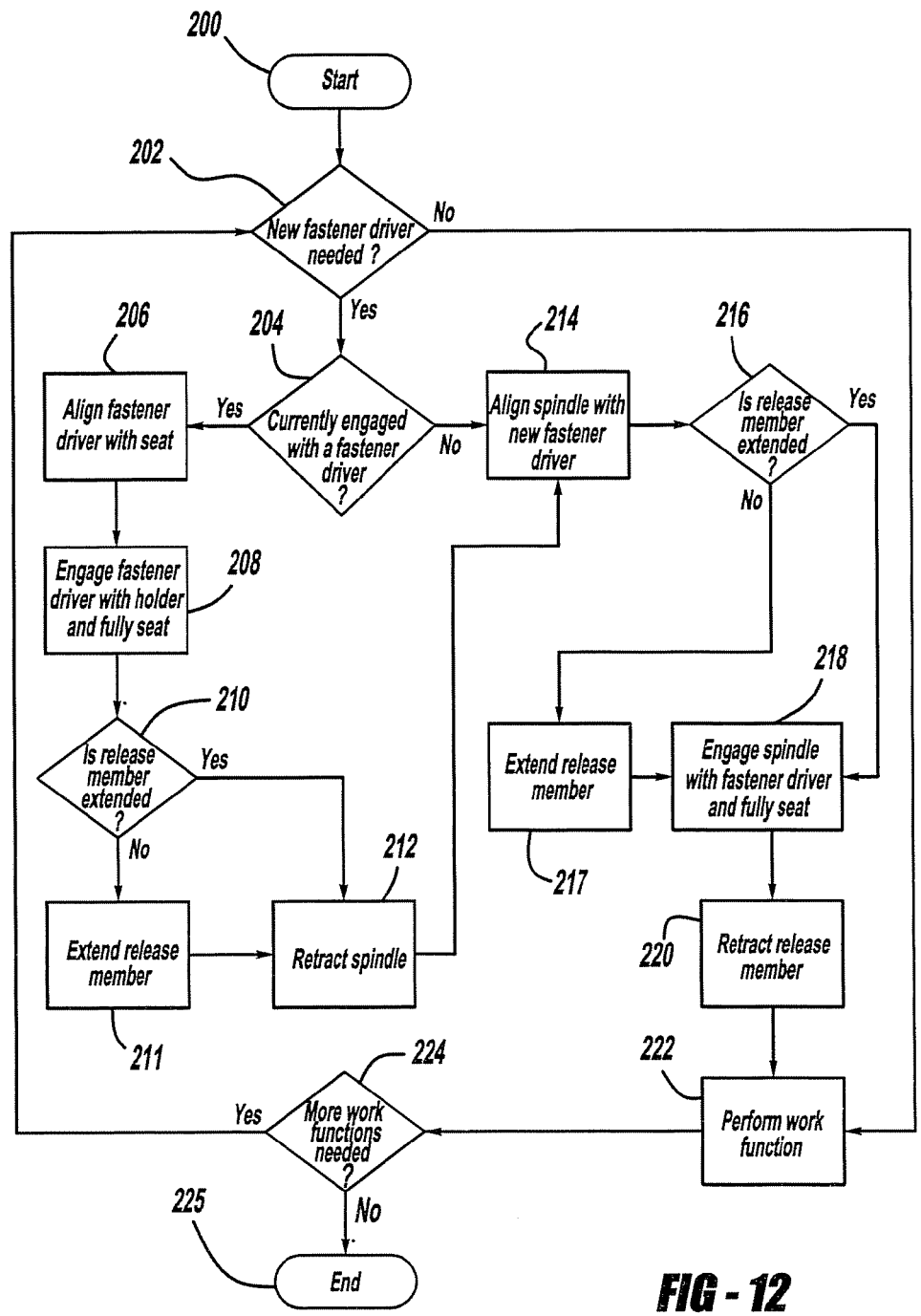
FIG. 12 is a flowchart detailing the method by which the preferred embodiment spindle assembly and holder assembly automate the process of changing fastener drivers.

FIGS. 11 and 12 illustrate the process and controller software logic for the present invention. Block 200 begins the process and logic wherein a new fastener driver is needed. In FIG. 11(a), distal end 47 is currently coupled with fastener driver 38 as the spindle assembly 23 advances towards holder 37 corresponding with blocks 202-204 in FIG. 12. In block 206, spindle assembly 23 rotates to align fastener driver 38 with seat 81, also illustrated in FIG. 11(b). After fastener driver 38 is aligned with seat 81, spindle assembly 23 further advances towards holder 37 to fully engage fastener driver 38 with seat 81 as illustrated in FIG. 11(c) corresponding to block 208 of FIG. 12. Automated release member 75 extends to uncouple the fastener driver 38 from distal end 47, corresponding to blocks 210 and 211 of FIG. 12. In FIG. 11(d), spindle assembly 23 retracts from holder 37 and then automated release member 75 retracts corresponding to block 212 of FIG. 12.

Distal end 47 is now free to couple with a second fastener driver 38'. In FIG. 11(e), spindle assembly 23 advances towards second fastener driver 38' which is currently engaged with a second seat 81'. Distal end 47 aligns with second fastener driver 38' corresponding to FIG. 11(f) and block 214 of FIG. 12. After distal end 47 is aligned with second fastener driver 38', automated release member 75 is fully extended corresponding to blocks 216 and 217 in FIG. 12. In FIG. 11(g), spindle assembly 23 further advances towards holder 37 to fully engage distal end 47 with second fastener driver 38', also corresponding to block 218 of FIG. 12. Automated release member 75 retracts to allow second fastener driver 38' to disengage second seat 81', corresponding to block 220 of FIG. 12. Spindle assembly 23 and second fastener driver 38' retract from holder 37 in FIG. 11(h) operable to perform a work function.

Figures 13, 14:
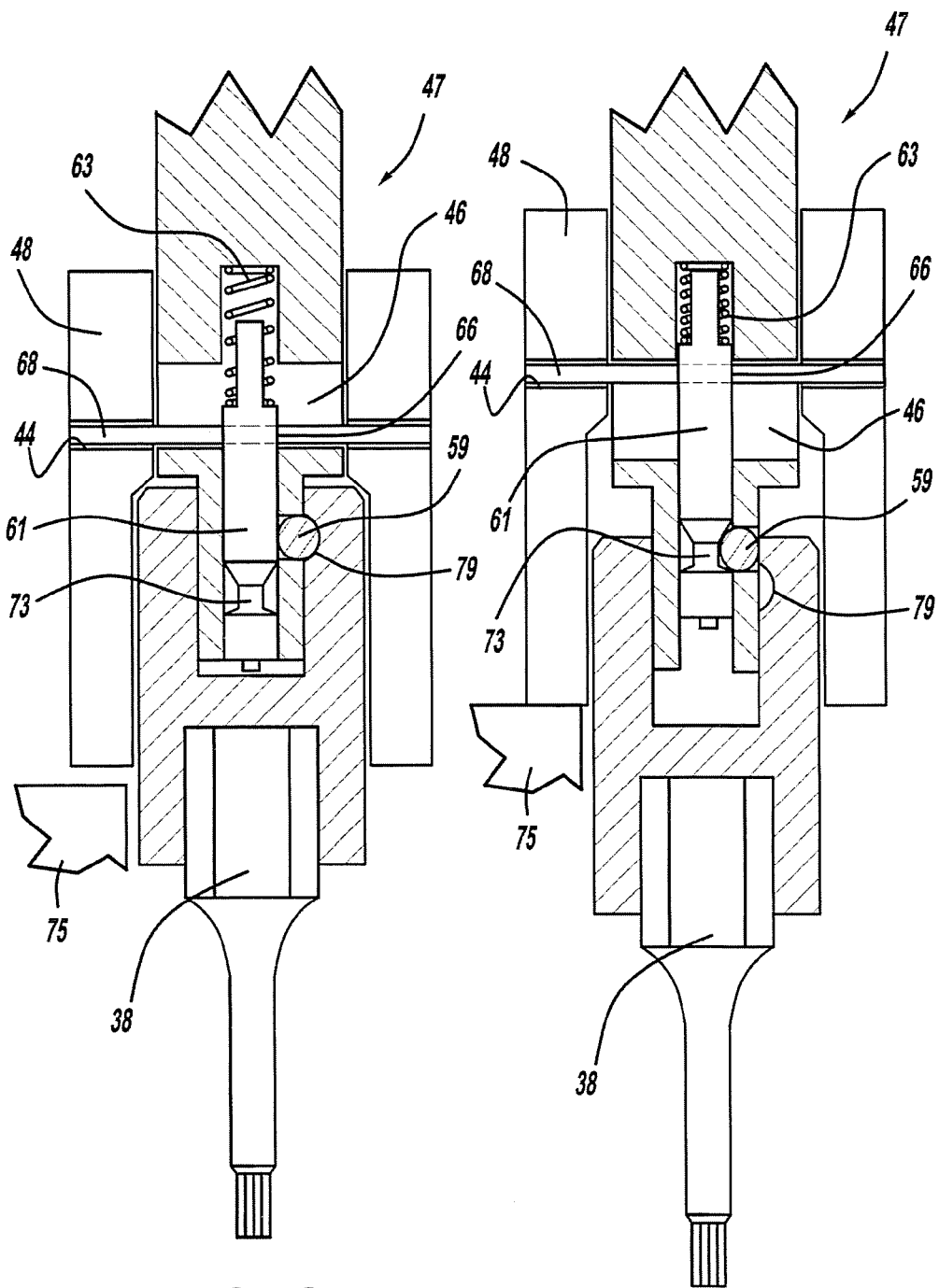
FIG. 13 is a partial cross-sectional view of a fastener driver engaged with a second preferred embodiment spindle assembly and the automated release member in a fully retracted position.
FIG. 14 is a partial cross-sectional view of a fastener driver in partial engagement with the second preferred embodiment spindle assembly and the automated release member in a fully extended position.
Figure 15:
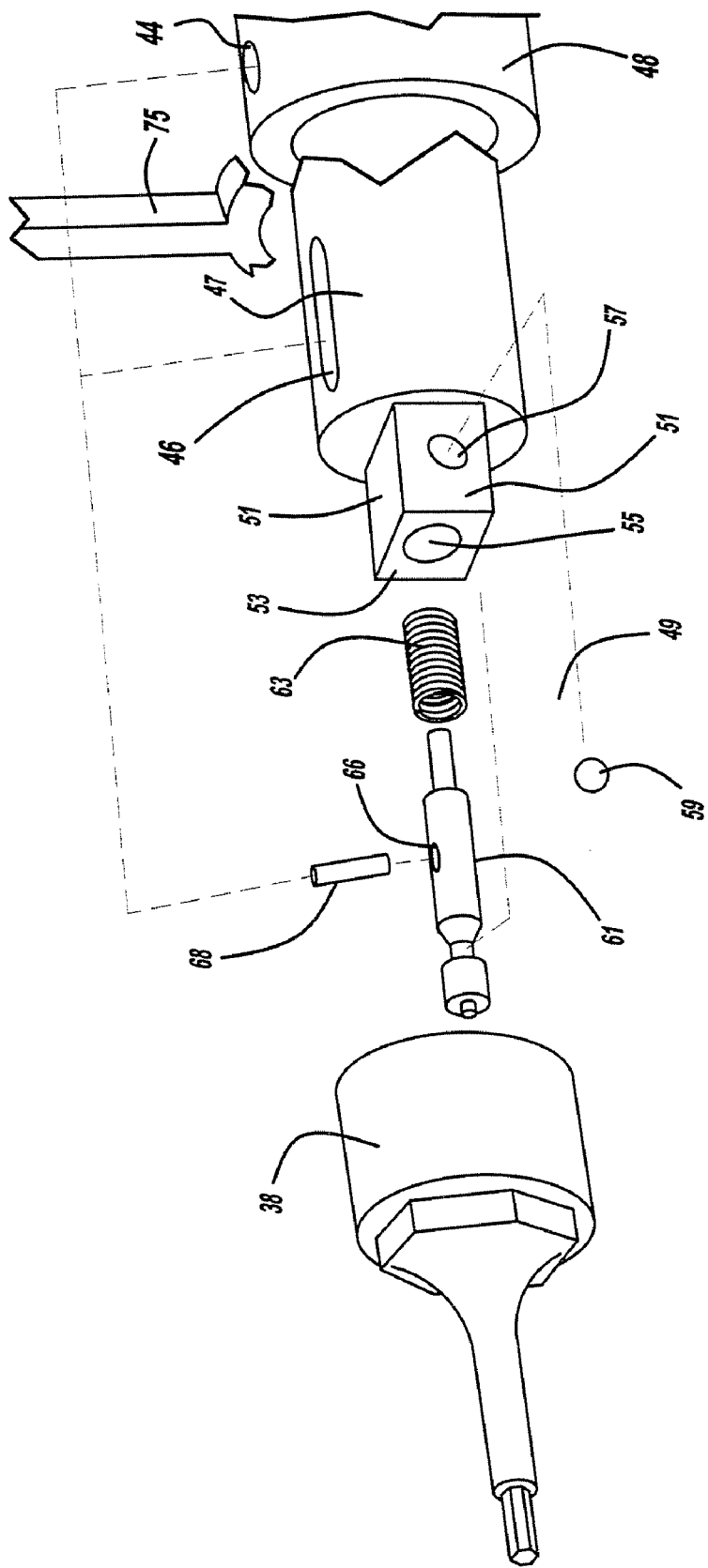
FIG. 15 is an exploded and fragmentary perspective view of the second preferred embodiment spindle.

FIGS. 13-15 illustrate a second preferred embodiment of the quick change spindle assembly in which distal end 47 engages and disengages with fastener driver 38 such as a bit driver. Fastener drivers such as bit drivers may not include fastener driver aperture 77. In FIGS. 13-15, distal end 47 further includes a sleeve collar 48 around distal end 47. Collar 48 is connected to drive member 61 by a dowel pin 68 attached at apertures 44. Dowel pin 68 extends through a slot 46 in distal end 47 and an aperture 66 in drive member 61 coupling collar 48 and drive member 61 together, and furthermore, preventing detachment of collar 48 from the distal end 47. In FIG. 15, automated release member 75 is a fork operable to apply a force to collar 48. In FIG. 13, automated release member 75 is retracted away from collar 48 allowing spring 63 to displace drive member 61 into an extended position in which locking ball 59 contacts fastener driver 38 at fastener driver recess 79. Fastener driver 38 is thusly locked to distal end 47. In FIG. 14, automated release member 75 contacts collar 48, and forces collar 48 to move drive member 61 into a retracted position in which locking ball 59 partially contacts recess 73. As locking ball 59 disengages fastener driver recess 79, fastener driver 38 is operable to uncouple from distal end 47. In addition, collar 48 can serve to guide and locate spindle 45 with respect to the fastener drivers 38 in the holder 37.

While the preferred embodiments of the quick change spindle assembly of the present invention have been disclosed, it will be appreciated that various alterations can be made. For example, a non-rotating tool such as a riveter requiring multiple different attachments may be used instead of a rotating fastener-driver. Furthermore, the locking ball mechanism may include a spring to force the ball into the recess of the drive member in the unlocked position. Also, various other locking mechanisms can be employed to lock the fastener driver to the distal end of the spindle such as a pin and a slot. In another embodiment, multiple automated release members may be associated with multiple seats on the holder. In yet another embodiment, a single automated release member may move into position with various seats. Furthermore, the release member may be a cylinder or sleeve or other member operable to move the drive member. Alternatively, the seats may change position enabling a single automated release member to be used. It is intended by the following claims to cover these and any other departures from the disclosed embodiment which fall within the true spirit of this invention.

The invention claimed is:

1. An automated tool comprising:
   a controller;
   a fastener driver;
   a first member having a first bore with an open end on a periphery of the first member, and a second bore with a first end connected to the first bore and a second end on the periphery of the first member, the first member operable to receive the fastener driver;
   a second member, at least partially disposed in the first bore and having an exposed end, the second member being movable between a first position and a second position;
   a third member at least partially disposed in the second bore and movable between a first position and a second position; and
   a fourth member disposed on the periphery of the first member and connected to the second member,
   wherein the controller causes a fifth member to apply a force to the second member to move the second member from the first position thereof to the second position thereof which causes the third member to be moved from the first position thereof to the second position thereof, and
   wherein the controller causes the fifth member to apply the force to the fourth member by moving the fifth member into contact with the fourth member.

2. The tool of claim 1, wherein the first member is a rotatable fastener driving spindle.

3. The tool of claim 1, wherein the second member is a drive rod including a recessed portion and the third member is a ball, the recessed portion operable to receive the ball.

4. The tool of claim 1 wherein the exposed end has a projection projecting therefrom.

5. The tool of claim 1, wherein the fifth member is an automated release member extending from a fastener driver holder when a fastener driver change is desired.

6. The tool of claim 1, wherein the fastener driver is a socket driver.

7. The tool of claim 1, wherein the fastener driver is a bit driver.

8. The tool of claim 1, further comprising an automotive powertrain workpiece and a robot arm operable to move the first member from the workpiece to a spaced apart fastener driver holder which operably holds multiple different fastener drivers for selective engagement by the first member.

9. The tool of claim 1, wherein the fourth member is a collar.

10. The tool of claim 9, wherein the fifth member is a fork.

11. An automated tool comprising:
    a robot arm;
    a fastener driver;
    a rotatable fastener driving spindle having a distal end with a first passageway with an open end on the periphery of the distal end, and a second passageway with a first end connected to the first passageway and a second end on the periphery of the spindle, the distal end operable to receive the fastener driver;
    a drive member, at least partially extending into the first passageway and having a drive end, the drive member being movable between a first position and a second position;
    a locking member at least partially disposed in the second passageway and movable between a locked position and an unlocked position;
    a holder assembly including a seat operable to receive the fastener driver; and
    a release member extending from the holder assembly, wherein the robot arm is operable to move the spindle from a workpiece to the holder assembly, and the release member is operable to apply a force to the drive member to move the drive member from the first position to the second position, causing the locking member to be moved from the locked position to the unlocked position.

12. The tool of claim 11, wherein the drive member is a drive rod including a recessed portion and the locking member is a ball, the recessed portion and the ball operating as a ball and detent locking mechanism.

13. The tool of claim 11, further comprising a spring that biases the drive member into the first position.

14. The tool of claim 13, wherein the first position is an extended position in which the drive member is extended relative to a proximal end of the spindle opposite the distal end, and the second position is a retracted position in which the drive member is retracted relative to the proximal end of the spindle.

15. The tool of claim 11, wherein the release member is operable to extend and retract relative to the holder assembly.

16. The tool of claim 11, wherein the release member is operable to extend and retract through an aperture in the fastener driver.

17. The tool of claim 11, wherein the fastener driver is a socket driver.

18. The tool of claim 11, wherein the fastener driver is a bit driver.

19. The tool of claim 11, wherein the release member is operable to apply the force to a sleeve collar connected to the drive member.

20. The tool of claim 11, wherein the release member is operable to extend and retract relative to the holder assembly in an area around the fastener driver.

21. The tool of claim 11, the workpiece is an automotive powertrain workpiece.

22. An automated quick change tool comprising:
    a socket driver;
    a rotatable spindle having a longitudinal axis, a distal end with an axial bore extending along the longitudinal axis, a proximal end opposite from the distal end, and a radial bore extending perpendicular to the longitudinal axis with a first end connected to the axial bore and a second end on the periphery of the spindle, the distal end being operable to receive the socket driver;
    a plunger, having a recessed portion, disposed within the axial bore of the spindle, and movable between an extended position in which the plunger is extended relative to the proximal end of the spindle and a retracted position in which the plunger is retracted relative to the proximal end of the spindle;
    a ball at least partially disposed in the radial bore, movable between a locked position in contact with the plunger and the socket driver at a location that is spaced apart from the recessed portion of the plunger and an unlocked position in contact with the recessed portion of the plunger; and
    an automated release member,
    wherein the automated release member is operable to move the plunger from the extended position to the retracted position causing the ball to move from the locked position to the unlocked position to release the socket driver.

23. The automated quick change tool of claim 22, further comprising:
    a holder operable to receive and release the socket driver;
    an automotive powertrain workpiece; and a robot arm operable to move the spindle between the holder and the workpiece.

24. An automated quick change tool comprising:
a bit driver;
a rotatable spindle having a longitudinal axis, a distal end with an axial bore extending along the longitudinal axis, a proximal end opposite from the distal end, and a radial bore extending perpendicular to the longitudinal axis with a first end connected to the axial bore and a second end on the periphery of the spindle, the distal end operable to receive the bit driver;
a plunger, having a recessed portion, disposed within the axial bore of the spindle, and movable between an extended position in which the plunger is extended relative to the proximal end of the spindle and a retracted position in which the plunger is retracted relative to the proximal end of the spindle;
a collar, movable between an extended position in which the collar is extended relative to the proximal end of the spindle and a retracted position in which the collar is retracted relative to the proximal end of the spindle;
a ball at least partially disposed in the radial bore, movable between a locked position in contact with the plunger and the bit driver at a location that is spaced apart from the recessed portion of the plunger and an unlocked position in contact with the recessed portion of the plunger; and
an automated release member,
wherein the automated release member is operable to move the collar, causing the plunger to move from the extended position of the plunger to the retracted position of the plunger, and causing the ball to move from the locked position to the unlocked position to release the bit driver.

25. The automated quick change tool of claim 24, further comprising:
a holder operable to receive and release the bit driver;
an automotive powertrain workpiece; and
a robot arm operable to move the spindle between the holder and the workpiece.

26. An automated tool comprising:
a controller;
a fastener driver;
a first member having a first bore with an open end and a second bore with a first end connected to the first bore and a second end on a periphery of the first member, the first member configured to be coupled to the fastener driver;
a second member, at least partially disposed in the first bore and movable between a first position and a second position;
a third member at least partially disposed in the second bore and movable between a first position and a second position; and
a fourth member disposed around the periphery of the first member and connected to the second member,
wherein the controller moves a fifth member into contact with the fourth member to apply a force to the fourth member and thereby move the second member from the first position thereof to the second position thereof, which moves the third member from the first position thereof to the second position thereof.

27. The tool of claim 26, wherein the first member is a spindle.

28. The tool of claim 26, further comprising a sixth member that biases the second member into the first position thereof.

29. The tool of claim 28, wherein the sixth member is disposed in the first bore.

30. An automated tool comprising:
a shaft having a distal end with a first bore, and a second bore with a first end connected to the first bore and a second end on a periphery of the shaft;
a drive rod, having a recessed portion, disposed within the first bore of the shaft, and movable between a first position and a second position;
a ball at least partially disposed in the second bore and movable between an unlocked position in which the ball engages the recessed portion of the drive rod and a locked position in which the ball is disengaged from the recessed portion of the drive rod;
a collar disposed around the periphery of the shaft and connected to the drive rod; and
a release member that is operable to move the collar and thereby move the drive rod from the first position to the second position, causing the ball to move from the locked position to the unlocked position.

31. The tool of claim 30, further comprising a fastener driver, wherein the distal end of the shaft is operable to receive the fastener driver, and moving the ball from the locked position to the unlocked position releases the fastener driver.

32. The tool of claim 30, wherein the release member is a fork.

33. An automated tool comprising:
a robot arm;
a fastener driver;
a housing member configured to be coupled to the fastener driver and having a first bore with an open end and a second bore with a first end connected to the first bore and a second end on a periphery of the housing member;
a drive member, at least partially disposed in the first bore and movable between a first position and a second position;
a locking member at least partially disposed in the second bore and movable between a locked position and an unlocked position;
a holder assembly including a seat operable to receive the fastener driver; and
a release member extending from the holder assembly,
wherein the robot arm is operable to move the housing member from a workpiece to the holder assembly, and the release member is operable to apply a force to the drive member to move the drive member from the first position to the second position, causing the locking member to be moved from the locked position to the unlocked position.

34. The tool of claim 1, wherein the first member is a one-piece member.

* * * * *